(No Model.)
L. F. HAEHNLEN.
CANDY BOX.
No. 348,671. Patented Sept. 7, 1886.
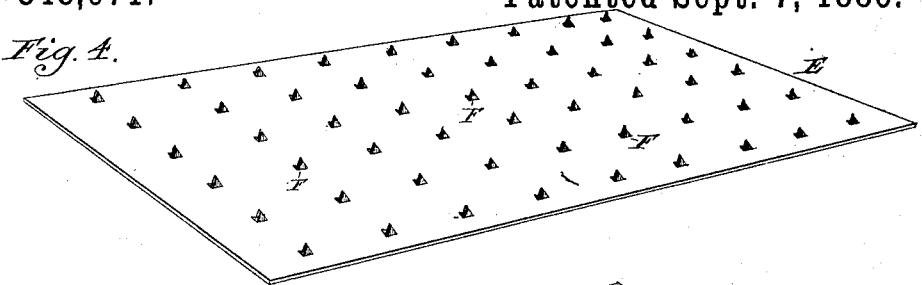
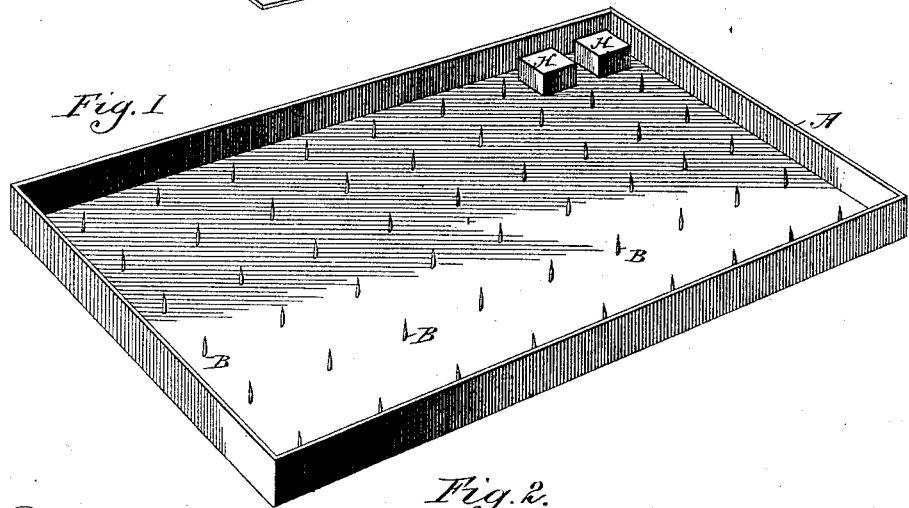
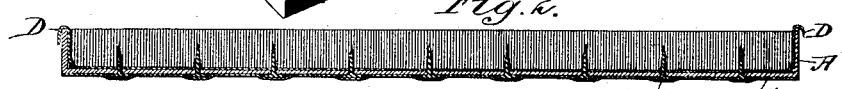
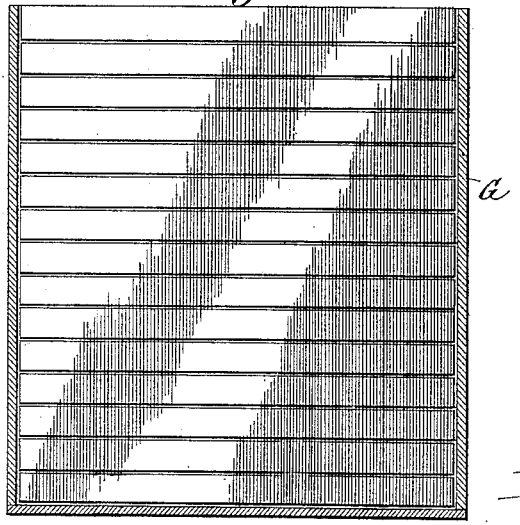
Witnesses,
L. F. Mann
Frederick F. Goodwin
Inventor,
Louis F. Haehnlen
By Offield Towle & Phelps
Atty's.

UNITED STATES PATENT OFFICE.

LOUIS F. HAEHNLEN, OF CHICAGO, ILLINOIS.

CANDY-BOX.

SPECIFICATION forming part of Letters Patent No. 348,671, dated September 7, 1886.

Application filed November 19, 1885. Serial No. 183,370. (No model.)

*To all whom it may concern:*

Be it known that I, LOUIS F. HAEHNLEN, a citizen of the United States, residing in Chicago, in the county of Cook and State of Illinois, have invented certain new and useful Improvements in Candy-Boxes, of which the following is a specification.

It is now customary in the candy business to wrap fine candies when preparing them for shipping in thin paper, waxed or otherwise prepared, in order to keep the several pieces of candy from adhering to each other, and to preserve as far as possible their fresh appearance. This manner of preparing candy for shipment has been found to entail a number of injurious and disagreeable results. When the paper is removed from the candy, the gloss and fresh appearance which it at first had has been destroyed. Moreover, the jars to which the pieces, resting against each other, have been subjected during transportation frequently cause them to be jammed together and deformed. It is sometimes quite difficult to remove the paper from the candy at all, and this always requires some little time and attention. Then after four or five days in the paper the candy when removed will taste of the wax, and if the temperature is warm the candy and wax together will produce a disagreeable odor. These several facts have caused consumers to regard wrapped candy as somewhat stale, and have seriously affected the sale of these goods. It will also be noted that some delay is occasioned after the manufacture of candy before shipping it, in order to permit it to cool, as it cannot be wrapped until it is cooled.

In order to overcome the various disadvantages above enumerated of the present manner of shipping candy, I have devised a peculiar form of box or tray, which I will now proceed to describe.

The special feature of my invention consists in the introduction into the box of a number of sharp points, upon which the pieces of candy may be placed at such a distance from each other as not to mutually interfere.

In the drawings, which accompany this application and form a part thereof, Figure 1 shows a box in perspective with the cover removed and provided with points B. Fig. 2 is a longitudinal cross-section of the same. Fig. 3 shows the boxes arranged in a case; and Fig. 4 represents a tin plate with points stamped upon it, which I propose to use in place of the tacks shown in Figs. 1 and 2.

The box A in Fig. 1 has a number of tacks, B, pressed through its bottom at such distances apart as to hold the pieces of candy H or other articles to be shipped therein at a proper distance from each other. A piece of paper, C, is pasted over the heads of the tacks upon the bottom of the box to keep the tacks from slipping out, and a layer of waxed paper, D, is placed within the box on the bottom to keep the candy from contact with the box-bottom. A similar piece of paper should be placed upon the top of the candy between it and the cover.

The material of which the box is composed may be paper, wood, metal, or any other desired. So, likewise, the points may be made of metal, as I have shown them, or they may be made of wood, paper, or other material. I do not limit myself in any of the details or parts of my invention to any special material. The waxed paper D need not necessarily be used; but will generally be found of advantage in keeping the candy off of the sides and bottom of the boxes.

In Fig. 4 I have shown a modified construction which I believe to be cheaper and more convenient than that above described. It consists of a sheet of metal, paper, or other material, as tin, E, having projections F stamped from it. These sheets can be laid into boxes of ordinary construction, and the candy placed upon them, with or without the layer of waxed paper shown in Fig. 2. It would be within my invention to stamp such projections out of the side and bottom of the box itself.

In Fig. 3 I have shown an arrangement of boxes or drawers in a casing, G, an arrangement which will be frequently found convenient in shipping candy in quanties.

I wish it understood that I propose to use my invention for packing and shipping all articles which can be advantageously packed and shipped in this way, as well as candy.

It will be observed that my invention dispenses entirely with wrapping-paper, and therefore avoids all the disadvantages above set forth, which accompany the wrapping of pieces of candy for shipment. The candy can be packed while it is still warm, does not come into injurious contact with any paper, its surface will be fresh and its form unimpaired when it arrives at its destination, and it can be shipped to great distances without any danger of injury on the way.

I am aware that shipping-boxes for candy have heretofore been made in which separate compartments have been arranged for the several pieces of candy. I do not claim this construction; but

What I claim is—

1. As an article of manufacture, a packing-box for small articles, provided with points projecting through the sides of top or bottom into the interior of the box, whereon the articles to be packed may be impaled, substantially as described.

2. The combination of the box or tray A, inwardly-protruding tacks B, and a layer of fibrous material, C, for holding the tacks in place.

3. As a mounting for pieces of candy and similar articles, a sheet of metal, paper, or other appropriate material having points stamped therefrom, substantially as described and shown.

LOUIS F. HAEHNLEN.

Witnesses:
FREDERICK C. GOODWIN,
E. L. HUBER.